(12) United States Patent
Chang et al.

(10) Patent No.: US 10,242,170 B2
(45) Date of Patent: Mar. 26, 2019

(54) METHOD AND APPARATUS FOR OBTAINING SENSING DATA

(71) Applicant: Samsung Electronics Co., Ltd., Gyeonggi-do (KR)

(72) Inventors: Moon Soo Chang, Gyeonggi-do (KR); Yang Soo Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 2 days.

(21) Appl. No.: 14/711,155

(22) Filed: May 13, 2015

(65) Prior Publication Data
US 2015/0332057 A1    Nov. 19, 2015

(30) Foreign Application Priority Data
May 13, 2014    (KR) .................. 10-2014-0057326

(51) Int. Cl.
| G06F 21/00 | (2013.01) |
| G06F 21/32 | (2013.01) |
| G06F 21/60 | (2013.01) |
| G06F 12/14 | (2006.01) |
| G06F 21/85 | (2013.01) |

(52) U.S. Cl.
CPC .......... *G06F 21/32* (2013.01); *G06F 12/1433* (2013.01); *G06F 21/60* (2013.01); *G06F 21/85* (2013.01); *G06F 2212/1052* (2013.01); *G06F 2212/154* (2013.01)

(58) Field of Classification Search
CPC ....................................................... G06F 21/32
See application file for complete search history.

(56) References Cited

U.S. PATENT DOCUMENTS

| 5,987,322 | A  | * | 11/1999 | Gupta ................... | H04W 48/16 455/432.1 |
| 6,073,122 | A  | * | 6/2000  | Wool ..................... | H04H 60/23 348/E7.056 |
| 6,901,241 | B2 | * | 5/2005  | Bjorndahl ........... | H04L 63/0428 455/41.2 |
| 8,332,682 | B2 | * | 12/2012 | Toshimitsu ........... | G06F 13/385 713/501 |
| 8,639,625 | B1 | * | 1/2014  | Ginter .................... | G06F 21/10 705/50 |
| 8,912,953 | B2 | * | 12/2014 | Jeong .................... | G01S 19/28 342/357.28 |
| 9,391,987 | B2 | * | 7/2016  | Blondeau ............... | G06F 21/31 |

(Continued)

*Primary Examiner* — Ali Shayanfar
(74) *Attorney, Agent, or Firm* — Cha & Reiter, LLC

(57) ABSTRACT

An electronic device according to various embodiments of the present disclosure may include at least one sensor module including a transmitter, a receiver, a secure memory for storing data obtained by the receiver, and a security control module for controlling the transmitter based on whether a target memory in which the obtained data is to be stored is the secure memory. In an example, the sensor may be a biometric sensor in which the transmitter transits an optical signal to a user's finger or iris or the like to authenticate the user. If malicious code attempting to defeat security is detected, so that the secure memory is not set up as the target memory, the security control module may control the transmitter by restricting transmission of signals.

15 Claims, 6 Drawing Sheets

(56) References Cited

U.S. PATENT DOCUMENTS

| | | | | |
|---|---|---|---|---|
| 2004/0236699 A1* | 11/2004 | Beenau | G06K 9/00382 | 705/64 |
| 2006/0149917 A1* | 7/2006 | O'Connor | G06F 12/1441 | 711/173 |
| 2007/0057763 A1* | 3/2007 | Blattner | G06F 3/03543 | 340/5.52 |
| 2007/0096870 A1* | 5/2007 | Fisher | E05B 19/0005 | 340/5.53 |
| 2007/0174617 A1* | 7/2007 | Carrel | G06F 21/12 | 713/168 |
| 2007/0247936 A1* | 10/2007 | Direnzo | G06F 12/0284 | 365/200 |
| 2008/0130957 A1* | 6/2008 | Small | G06F 21/32 | 382/115 |
| 2008/0148392 A1* | 6/2008 | Akens | G06F 21/32 | 726/19 |
| 2008/0155268 A1* | 6/2008 | Jazayeri | G06F 21/32 | 713/186 |
| 2009/0249079 A1* | 10/2009 | Suzuki | G06F 21/575 | 713/186 |
| 2009/0327743 A1* | 12/2009 | Finlayson | G06F 21/32 | 713/186 |
| 2010/0218026 A1* | 8/2010 | Toshimitsu | G06F 13/385 | 713/324 |
| 2011/0161848 A1* | 6/2011 | Purcell | G06F 21/554 | 715/764 |
| 2011/0239282 A1* | 9/2011 | Svarfvar | H04L 63/0815 | 726/5 |
| 2012/0181333 A1* | 7/2012 | Krawczewicz | G06K 19/0718 | 235/380 |
| 2012/0246392 A1* | 9/2012 | Cheon | G06F 12/0871 | 711/103 |
| 2013/0103190 A1* | 4/2013 | Carapelli | G06F 21/82 | 700/237 |
| 2013/0122890 A1* | 5/2013 | Ito | G06F 3/14 | 455/422.1 |
| 2013/0244710 A1* | 9/2013 | Nguyen | G01S 13/0209 | 455/501 |
| 2013/0305342 A1* | 11/2013 | Kottilingal | G06F 21/62 | 726/11 |
| 2014/0068150 A1* | 3/2014 | Yun | G06F 3/0688 | 711/103 |
| 2014/0135077 A1* | 5/2014 | Leviant | G01S 5/22 | 455/570 |
| 2015/0074744 A1* | 3/2015 | McLean | H04L 63/20 | 726/1 |

* cited by examiner

METHOD AND APPARATUS FOR OBTAINING SENSING DATA

CLAIM OF PRIORITY

This application claims the benefit under 35 U.S.C. § 119(a) of a Korean patent application filed on May 13, 2014 in the Korean Intellectual Property Office and assigned Serial number 10-2014-0057326, the entire disclosure of which is hereby incorporated by reference.

TECHNICAL FIELD

The present disclosure relates to a technology for securely storing data obtained by a sensor in a protected area of a memory.

BACKGROUND

Sensors may obtain and store various data according to the types or functions of the sensors. For example, a metal detection sensor or a fingerprint recognition sensor may obtain information on whether a subject contains a metal material or fingerprint information. Electronic devices such as smartphones or tablets may include a plurality of sensors such as an illumination sensor, a proximity sensor, an acceleration sensor, a gyro sensor and the like, and may obtain various data using the sensors.

Electronic devices including sensors may sense personal unique characteristic information from friction ridges of a finger, a voice, a retina, an iris or the like to use the information for the purpose of user authentication.

A security system based on an ID and a password may be vulnerable to fraudulent use, loss or oblivion of authentication information. However, in such a security system based on an ID and a password, additional damage may be prevented by changing passwords or IDs and passwords. On the contrary, a security system based on biometric information such as a fingerprint, a retina pattern, an iris pattern or the like provides strong user authentication and security, but has the risk of leakage of biometric information which may enable hackers to defeat the security system and cause serious problems.

SUMMARY

An aspect of the present disclosure is to provide a method and device for preventing data obtained by a sensor from being leaked externally of a security area while maintaining a hardware configuration of a typical sensor or an electronic device for driving the sensor.

In accordance with an aspect of the present disclosure, an electronic device is provided. The electronic device may include at least one sensor module including a transmitter, a receiver, a secure memory for storing data obtained by the receiver, and a security control module for controlling the transmitter based on whether a target memory in which the obtained data is to be stored is the secure memory. In an example, the sensor may be a biometric sensor in which the transmitter transmits an optical signal to a user's finger or iris or the like to authenticate the user. If malicious code attempting to defeat security is detected, so that the secure memory is not set up as the target memory but instead another memory is set up as the target memory, the security control module may control the transmitter by restricting transmission of signals.

An illustrative method for obtaining data using a sensor module in an electronic device includes setting up a secure memory as a target memory for storing of data obtained by a receiver of the sensor module; checking whether the target memory is set up as the secure memory before a signal is transmitted from a transmitter of the sensor module; and controlling transmission of the signal based on a result of the checking.

DETAILED DESCRIPTION

Figure 1:
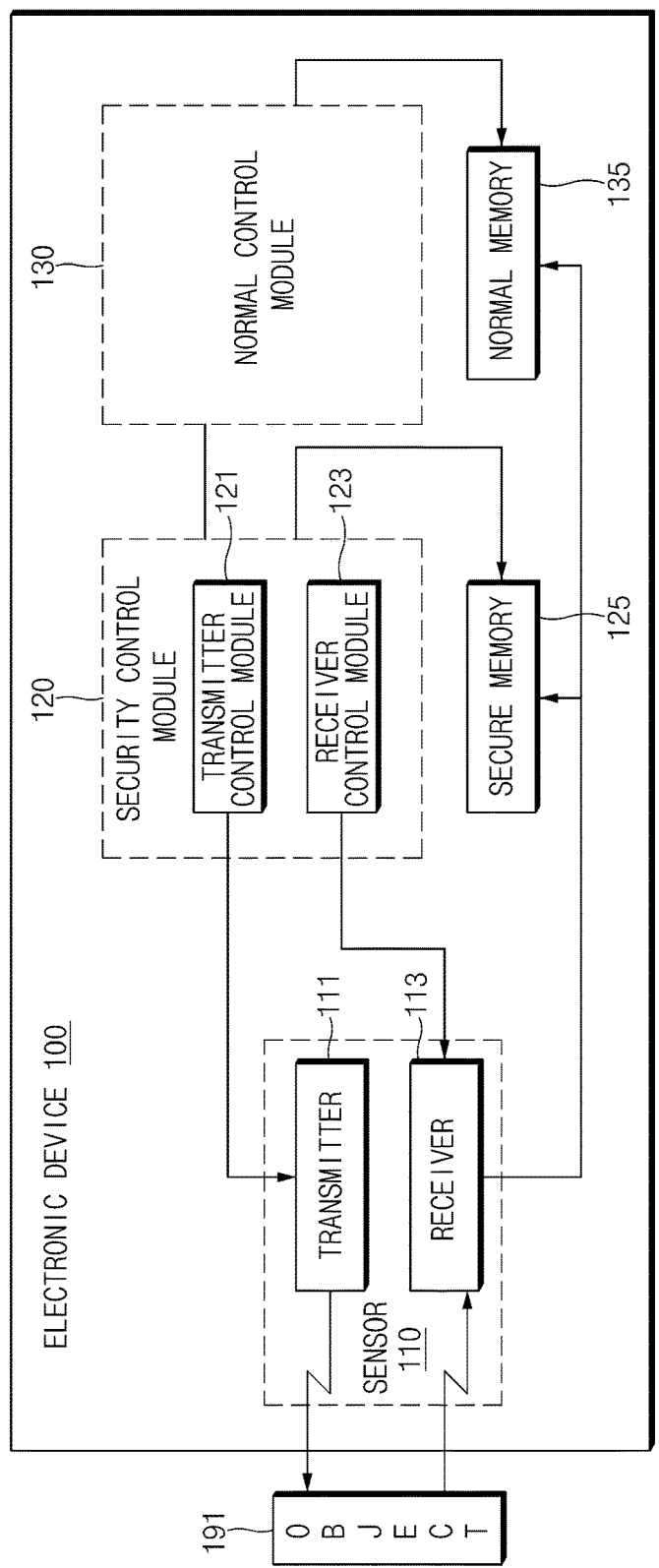
FIG. 1 illustrates a sensor data acquisition device according to various embodiments of the present disclosure.

Hereinafter, various embodiments of the present disclosure will be described with reference to the accompanying drawings. The present disclosure may be variously modified and may include various embodiments. However, specific embodiments are exemplarily illustrated in the drawings and detailed descriptions related thereto are provided. However, it should be understood that various embodiments of the present disclosure are not limited to specific examples but rather include all modifications, equivalents and alternatives that fall within the sprit and scope of various embodiments of the present disclosure. Regarding the drawings, like reference numerals refer to like elements.

The term "include," "comprise," "including," or "comprising" used herein indicates disclosed functions, operations, or existence of elements but does not exclude other functions, operations or elements. It should be further understood that the term "include", "including", "comprise", "comprising", "have", or "having" used herein specifies the presence of stated features, numbers, operations, elements, components, or combinations thereof but does not preclude the presence or addition of one or more other features, numbers, operations, elements, components, or combinations thereof.

The meaning of the term "or" or "at least one of A and/or B" used herein includes any and all combinations of words listed together with the term. For example, the wording "A or B" or "at least one of A and/or B" may indicate A, B, or both A and B.

The terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, a first user device and a second user device indicate different user devices. For example, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements.

The terminology used herein is not for delimiting the present disclosure but for describing specific various embodiments of the present disclosure. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal detect unless otherwise defined explicitly.

Electronic devices according to various embodiments of the present disclosure may include a sensor. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., head-mounted-devices (HMDs) such as electronic glasses, an electronic apparel, electronic bracelets, electronic necklaces, electronic appcessories, electronic tattoos, or smart watches).

Further, the electronic devices may be smart home appliances including a sensor. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, or the like.

In other examples, the electronic devices may include at least one of medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for ships (e.g., navigation systems and gyrocompasses), avionics, security devices, head units for vehicles, industrial or home robots, automatic teller's machines (ATMs), or points of sales (POSs) including a sensor.

Further, the electronic devices may be parts of furniture or buildings/structures, electronic boards, electronic signature receiving devices, projectors, or measuring instruments (e.g., water meters, electricity meters, gas meters, or wave meters) including a sensor. The electronic devices may be one or more combinations of the above-mentioned devices. Furthermore, the electronic devices may be flexible devices. Moreover, the electronic devices are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses the electronic device.

FIG. 1 illustrates an electronic device, 100, which is a sensor data acquisition device according to various embodiments of the present disclosure.

Electronic device 100 may include a sensor 110, a "normal" control module 130 which may be a general type of control module, and a security control module 120. Herein, the term "normal" does not necessarily imply conventional. Instead, "normal" may refer to an element that is not specifically dedicated for a security function.

The security control module 120 and the normal control module 130 may be operated as individual pieces of hardware. In various embodiments, the security control module 120 and the normal control module 130 may actually be embodied as parts of a common piece of hardware (e.g., a processor), and implemented by applying a time-sharing system to resources of such hardware. Security control module 120 and first control module 130 may also be implemented using a hardware virtualization method. For convenience of description, it is assumed that the security control module 120 is physically separated from the normal control module 130 with respect to the embodiment of FIG. 1. Another embodiment in which the security control module 120 is logically separated from the normal control module 130 will be described with reference to FIG. 2.

In various embodiments, sensor 110 includes a transmitter 111 and a receiver 113. Sensor 110 may be an active sensor, in which case sensor 110 may obtain data by transmitting an arbitrary or specific signal and receiving a response to the transmitted signal. In the case of a passive sensor, sensor 110 may receive a signal (or information) detected in a natural state, even without the transmitting. Sensor 110 may include the transmitter 111 for transmitting an arbitrary or specific signal and the receiver 113 for receiving a response signal to a transmitted signal. For instance, transmitter 111 may output an optical signal which reflects off an external object 191 like a user's finger or iris, and the reflected optical signal may be received by receiver 113. Sensor 110 may be constructed as a hardware module (e.g., a sensor module) configured to perform a desired function.

In various embodiments, a signal transmitted from the transmitter 111 may be an auxiliary signal for improving the accuracy or reliability of obtained data. For example, in the case of an iris recognition sensor (which may be a camera), the accuracy of iris recognition may be degraded if visible light is used for the iris recognition since light reflected from peripheral objects arrives at an iris area. However the accuracy of an iris image may be improved if infrared light is used instead of visible light. Sensor 110 comprised of an iris recognition sensor may emit infrared light (e.g., IR LED light) through the transmitter 111 and may receive light of an infrared wavelength band through the receiver 113 to obtain an iris image.

In various embodiments, the sensor 110 may include not only a typical active sensor for transmitting a signal and receiving a response thereto but also any type of sensor that transmits an arbitrary or specific signal during a data acquisition process. Also, FIG. 1 illustrates that the transmitter 111 is included in the sensor 110, but the sensor 110 (or the receiver 113) may be separate from the transmitter 111 in various other examples. For example, night photography may be performed using a flash component (e.g., the transmitter 111) and a camera (e.g., the receiver 113). If an operation of the transmitter (e.g., a flash) is restricted by a security process according to an embodiment of the present disclosure, a malicious user may be prevented from obtaining a normal image.

In various embodiments, the sensor 110 may be used to obtain data for which security is required. For example, the sensor 110 may be a biometric recognition sensor such as a fingerprint recognition sensor, an iris sensor, a retina sensor, a face recognition sensor, a vein sensor, or the like. In various other embodiments, the sensor may not be a biometric recognition sensor but an application associated with the sensor may be related to user authentication such as handwriting recognition or user voice recognition. (In the case of voice recognition, the sensor may be realized by just a microphone of device 100 in conjunction with suitable voice recognition software/hardware.) In various embodiments, the sensor 110 may include not only a sensor that requires security due to its own characteristic, such as a biometric recognition sensor, but also any sensor operated by an application that requires security.

The security control module 120 performs an operation related to security of the electronic device 100, and may include a receiver control module 123 and a transmitter control module 121 for securing data obtained from the sensor 110. The security control module 120 may further include a secure memory 125. Alternatively, secure memory 125 and the security control module 120 may be separately included in the electronic device 100, such as in the configuration illustrated in FIG. 1.

The transmitter control module 121 may control the transmitter 111. The transmitter control module 121 may control the transmitter 111 operated in association with the sensor 110 as mentioned above. The transmitter control module 121 may control the transmitter 111 to transmit a specified signal. This signal may correspond to waves (or light) having a specified band or intensity, such as infrared light, ultraviolet light, ultrasonic waves, white light (e.g., LED), or the like.

The receiver control module 123 may control the receiver 113 of the sensor 110. In various embodiments, the receiver control module 123 may set a memory for storing data obtained by the receiver 113. For example, the receiver control module 123 may allow data obtained by the receiver 123 (or the sensor 110) to be stored in a target memory (e.g., the secure memory 125) set by a processor (e.g., the normal control module 130) for a sensor or an application.

The normal control module 130 may perform overall control of the electronic device 100. In various embodiments, the normal control module 130 may correspond to an application processor (AP). Normal control module 130 may further include a communication processor (CP) (not shown) for controlling a communication function or a graphic processor unit (GPU) (not shown) for controlling a display function. The normal control module 130 may further include a normal memory 135. Alternatively, the normal memory 135 and the normal control module 130 may be separately included in the electronic device 100, such as in the illustrated example of FIG. 1. Normal memory 135 may be designated for storing non-security related information and may alternatively be referred to as a "first memory".

In various embodiments, a normal sensing data acquisition process may be performed as described below. For example, when a function for releasing a lock state of the electronic device 100 or a function that requires user authentication is performed, the normal control module 130 may request user authentication from the security control module 120. The security control module 120 may access user authentication information (e.g., biometric data) obtained through the sensor 110 and stored in the secure memory 125 to determine whether a user is an authorized user. The security control module 120 may transfer a result of the determination to the normal control module 130. For example, the security control module 120 may compare biometric information such as users' fingerprints or iris patterns pre-stored in the secure memory 125 with biometric information obtained through the sensor 110 to determine whether the biometric information of the secure memory 125 matches the biometric information obtained through the sensor 110, and may transfer a result of the determination to the normal control module 130. If the result of the determination indicates an authorized user, the normal control module 130 may unlock the electronic device 100 or may perform a function such as a payment function or the like. If the result of the determination indicates a mismatch of the user authentication information, the normal control module 130 may output a user authentication failure message or may maintain the lock state of the electronic device 100.

In the case of acquiring data for which a high level of security is required through a fingerprint recognition sensor, an iris recognition sensor, or the like, the electronic device 100 may designate (or set) the secure memory 125 (or a specific area of the secure memory 125) for a storage operation once a corresponding sensor or an application associated therewith is driven. The receiver control module 123 may set the designated memory as the target memory of the sensor 110. Once the target memory is set, the receiver control module 123 may hand over control authority to the transmitter control module 120 so that data is obtained.

The transmitter control module 121 may determine whether the target memory, set by the receiver control module 123 so as to store data, corresponds to the secure memory 125, before instructing the sensor 110 or the transmitter 111 to transmit a signal. If the target memory is the secure memory 125, the transmitter control module 121 may transfer, to the transmitter 111, an instruction or a signal for instructing the transmitter 111 to transmit a signal. In response to (or using) the signal transmitted from the transmitter 111, i.e., by capturing a reflected portion of the transmitted signal, the receiver 111 may obtain appropriate data (e.g., a fingerprint recognition pattern image, an iris or retina scan image, or the like) and may store the data in the target memory (the secure memory 125 in this case).

Due to hacking, malware such as malicious codes, a system error, or the like, the target memory may not be designated as the secure memory 125 as it should be correctly designated. Instead, the hacking, etc. may cause the normal memory 135 to be designated as the target memory. To address this situation, if the target memory does not correspond to the secure memory 125, the transmitter control module 121 may restrict signal transmission of the transmitter 111. For example, the transmitter control module 121 may not transfer a signal transmission instruction to the transmitter 111, or more actively, may transfer a signal transmission prohibition instruction to the transmitter 111. When signal transmission of the transmitter 111 is restricted in this manner, data may be unable to be obtained by the sensor 110, or the accuracy or reliability of obtained data may be significantly degraded.

During a sensing data acquisition process, an operation for setting the secure memory 125 as the target memory of the receiver 113 may be attacked by a hacker. For example, a sensor-related code or a sensor-related application may be counterfeited or falsified so that the normal memory 135 may be designated by the normal control module 130 as the target memory for storing authentication information. In this scenario, the receiver control module 123 may directly assign the normal memory 135 as the target memory of the receiver 113. In this case, data transferred from the receiver 113 is exposed to the normal memory 135, access to which is easy. Such data may be arbitrarily stored or maliciously used.

The security control module 120 may intervene to prevent such an attack. However, unless the normal control module 130 intentionally hands over control authority to the security control module 120, it may be difficult for the security control module 120 to intervene. Furthermore, even if the control authority is handed over to the security control module 120 at an arbitrary step, security information may be exposed if falsification has been performed by a hacker which causes an operation for checking the target memory to be skipped.

Sensor 110 may be configured such that the transmitter 111 is necessarily used to obtain data required to have at least a certain degree of accuracy, or, quality or data itself is unable to be obtained without using the transmitter 111. In this case, transmitter control module 121 may control transmitter 111. The target memory for obtaining data may be checked by the transmitter control module 121 before data is obtained, and, if the target memory is set to be the normal memory 135, data acquisition itself may be prevented or acquisition of low-quality data may be allowed.

Figure 2:
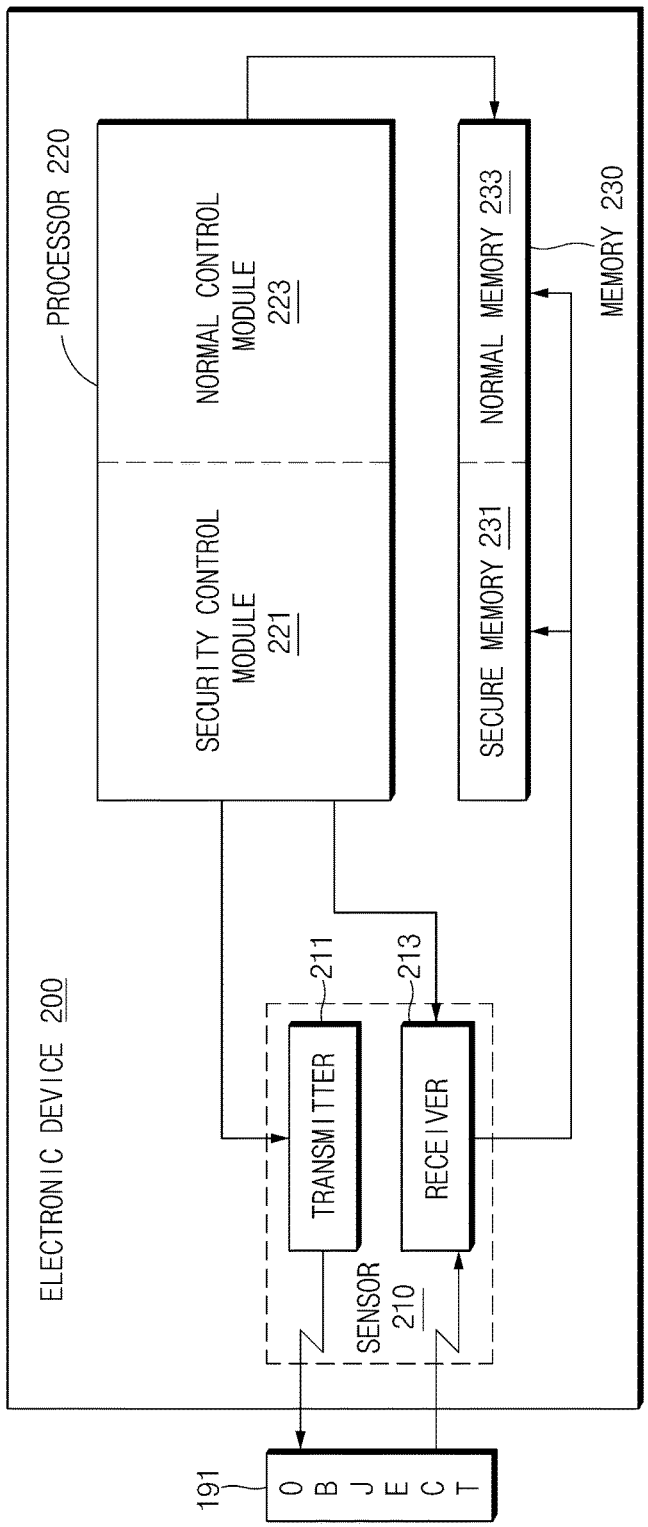
FIG. 2 illustrates a sensor data acquisition device in which a security area is logically separated from a normal area according to various embodiments of the present disclosure.

FIG. 2 illustrates a sensor data acquisition device in which a security area is logically separated from a normal area according to various embodiments of the present disclosure. Descriptions of FIG. 2 which overlap with, correspond to or are similar to those of FIG. 1 may not be provided below.

As shown in FIG. 2, an electronic device 200 may include a sensor 210, a processor 220, and a memory 230. In the electronic device 200, the processor 220 and the memory 230 may be independent pieces of hardware.

The processor 220 may be logically divided into a security control module 221 and a normal control module 223. For example, the security control module 221 may be logically separated from the normal control module 223 using a virtualization method or a method of enhancing security through isolation of codes and data.

For example, one physical process core may be divided into a secure region and a normal region. For each region, registers of a central processing unit (CPU) may be separated from each other and registers related to a page table may be separated from each other. Therefore, an address of a table used for virtual address-physical address conversion may be differently set, so that each region may be allowed to read different respective address spaces.

The electronic device 200 may designate a device (e.g., a transmitter 211) or a memory area (e.g., a secure memory 231) accessible by a secure region (e.g., a region of a physical process core set as the security control module 221). If a normal region (e.g., a region set as the normal control module 223) attempts to access a device area (e.g., the transmitter 211 or the secure memory 231) assigned so as to be accessible by the secure region, page fault may occur.

Regarding the electronic device 100 of FIG. 1, since the security control module 120 (or the transmitter control module 121) is directly connected as independent hardware to the transmitter 111, an additional software configuration process may be omitted. However, according to the electronic device 200 of FIG. 2, since the security control module 221 is not independent hardware but is located in a logically separated hardware area, software configuration may be performed so that the transmitter 211 is connected to the security control module 221 in a chain of trust established using a technology such as secure boot.

In the case of using the secure boot technology, a unified extensible firmware interface (UEFI) of an electronic device pre-stores a list of keys for identifying reliable hardware, firmware, and operating system codes and a list of keys for identifying known malware. The UEFI may further inspect a ROM, a UEFI driver, a UEFI application, an operating system, and the like to compare the foregoing elements with the pre-stored lists of keys at the time of booting the electronic device, so as to allow the electronic device to be booted only if the foregoing elements are valid. In this manner, the electronic device may be prevented from being infected or attacked by malicious codes or the like when being booted.

If the security control module 221 is securely connected to the transmitter 211 through the secure boot and the chain of trust, the transmitter 211 may not be controlled through the normal control module 223. Even if a malicious user or a malicious code intervenes in an operation of setting the secure memory 231 as the target memory so as to fake the target memory with a normal memory 233, the security control module 221 may determine whether the secure memory 231 is set as the target memory before transferring a control signal to the transmitter 211. If the secure memory 231 is not set as the target memory, the security control module 221 may prevent the transmitter 211 from transmitting a signal, or may perform a security operation.

An electronic device according to various embodiments of the present disclosure may include at least one sensor module including at least one of a transmitter or a receiver, a secure memory for storing data obtained by the receiver, and a security control module for controlling the transmitter based on whether a target memory in which the obtained data is to be stored is the secure memory.

The security control module may include a transmitter control module and a receiver control module, wherein the transmitter control module may be configured to control the transmitter.

If the target memory in which the obtained data is to be stored is the secure memory, the security control module may allow the transmitter to transmit a signal for obtaining the data.

If the target memory in which the obtained data is to be stored is not the secure memory, the security control module may prevent the transmitter from transmitting a signal for obtaining the data. The electronic device may further include a display unit configured to output content related to a security risk.

The electronic device may further include a receiver control module for storing, in the target memory, the data obtained by the receiver.

The sensor module may be a biometric information recognizing sensor module.

The transmitter may be directly connected to the transmitter control module.

The electronic device may include a normal control module physically separated from the security control module and a normal memory physically separated from the secure memory, wherein the normal control module may set one of the secure memory and the normal memory as the target memory.

The security control module is a portion of a processor including a normal control module logically separated from the security control module, and the secure memory is a portion of a memory including a normal memory logically separated from the secure memory, wherein the normal control module may set one of the secure memory and the normal memory as the target memory. For example, the electronic device may include a processor including a secure control module and a normal control module logically separated from each other, and a memory including a secure memory (area) and a normal memory (area) also logically separated from each other, wherein the normal control module may set one of the secure memory area and the normal memory area as the target memory.

Figure 3:
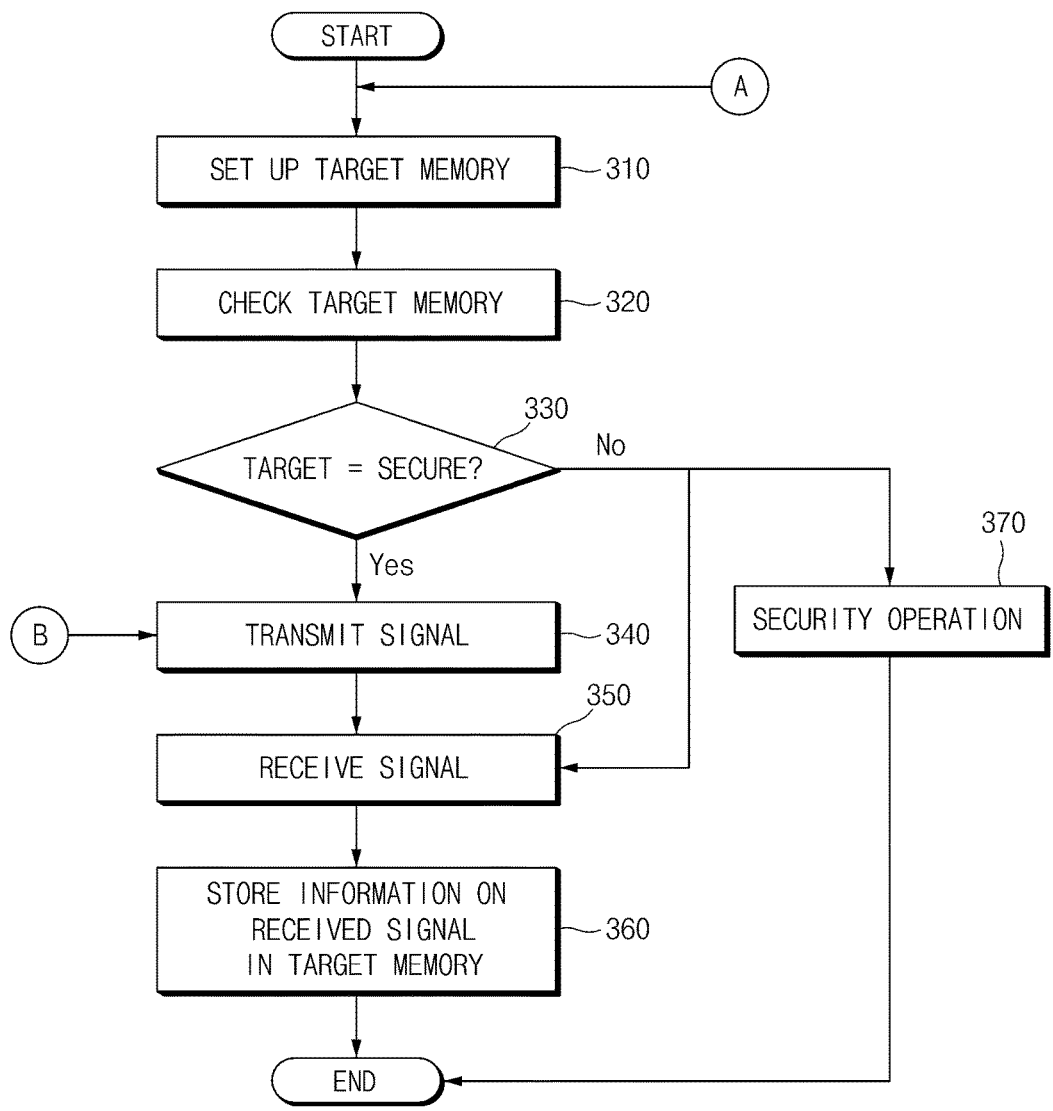
FIG. 3 illustrates a sensor data acquisition process according to various embodiments of the present disclosure.

FIG. 3 is a flow chart illustrating a sensor data acquisition process (method) according to various embodiments of the present disclosure. Descriptions of the process of FIG. 3 which overlap with, correspond to or are similar to the above descriptions may not be provided below. In the below-described method, "electronic device" refers to the electronic device 100 or 200 or equivalent devices.

In operation 310, the electronic device may set a target memory. For example, the electronic device may set the secure memory 125 as the target memory in which data obtained by the receiver 113 of the sensor 110 is to be stored.

In various embodiments, in the case where a region corresponding to a security control module is logically separated from a region corresponding to a normal control module in the electronic device 200, the electronic device 200 may connect a transmitter 211 of a sensor 210 to the security control module 221 before operation 310 is performed.

An example preprocessing operation performed before operation 310 for setting the target memory will be described later with reference to FIG. 4.

In operation 320, the electronic device may check the target memory. For example, the security control module 120 (or the transmitter control module 121) or the security control module 221 may determine whether the target memory is a secure memory or a normal memory before a signal is transmitted from the transmitter of the sensor.

In operation 330, the electronic device may control transmission of a signal of the transmitter for a sensing operation based on a result of the determination of operation 320. For example, if the target memory indicates the secure memory, the process may proceed to operation 340, or, if the target memory is not the secure memory, the process may proceed to operation 350 or 370.

If the target memory is not the secure memory, the process may proceed to operation 350. In this case, a signal received in operation 350 is information obtained while a signal for improving the accuracy or reliability of obtained data is unable to be transmitted from the transmitter, whereby the usefulness of the received signal as information may be very low.

If the target memory is not the secure memory, the process may proceed to operation 370. In operation 370, the electronic device may perform a security operation. For example, the electronic device may output content related to a security risk (e.g., a security warning message) to a display unit. Alternatively, the electronic device may enter a lock state, or may discard data obtained by the receiver of the sensor. Furthermore, a control signal for restricting transmission of a signal may be transferred to the transmitter of the electronic device (or the sensor).

If the secure memory is set as the target memory, the electronic device (e.g., the sensor 110 or the sensor 210) may allow the transmitter (e.g., the transmitter 111 or 211) to transmit a signal in operation 340.

In operation 350, the electronic device may receive a response signal for the signal transmitted from the transmitter. The response signal may have been generated through a change of the signal transmitted from the transmitter by an object 191. In various embodiments of the present disclosure, the response signal may be a signal enhanced (e.g., a relatively clear image) using a transmitted signal (e.g., light of an LED or a xenon lamp, infrared light, or the like).

In operation 360, the electronic device may store, in the target memory, data (e.g., biometric information such as a fingerprint or an iris pattern) obtained from the response signal. In the case where the process proceeds to operation 340 in operation 330, the target memory may be the secure memory. In the case where the process proceeds to operation 350 in operation 330, the target memory may be the normal memory, but this case may be unrelated to a security operation, as explained below in connection with FIG. 4. In operation 360, since only the secure memory was designated as the target memory prior to the signal transmission of operation 340, for a security operation, the target memory in operation 360 is the secure memory rather than the normal memory. In other words, when the target memory in operation 330 is determined as the normal memory, operation 360 is bypassed and no security information on any received signal may be stored in the normal memory.

Figure 4:
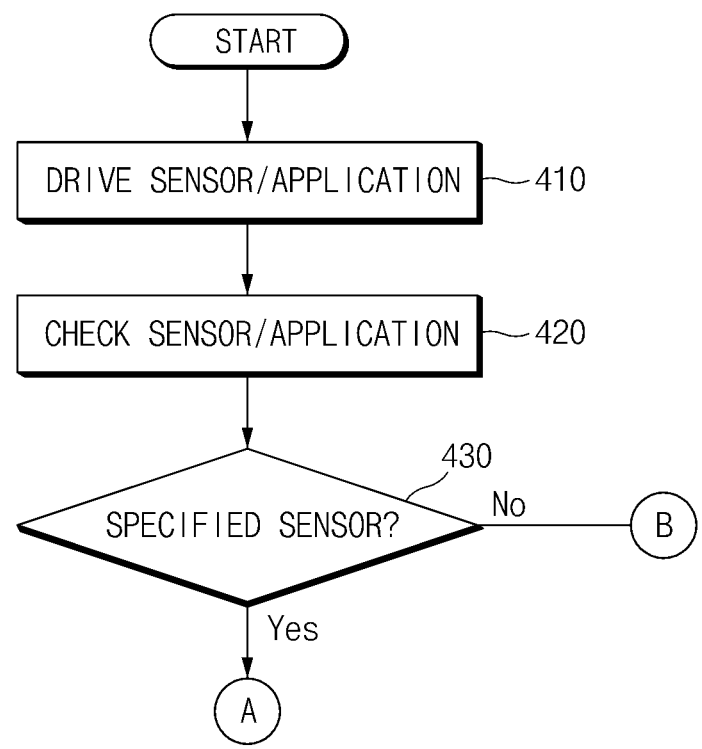
FIG. 4 illustrates a preprocessing operation of a sensor data acquisition process according to various embodiments of the present disclosure.

FIG. 4 illustrates preprocessing operations of the sensor data acquisition process of FIG. 3 according to an example.

The electronic device may drive a sensor or execute (or run) an application associated with the sensor. For example, some sensors may be activated in response to turning on the electronic device or release of a lock state of the electronic device. In various embodiments, the sensor may not be driven even if the application is driven. In this case, the sensor may be driven after a predetermined setting process or after a particular operation is performed.

In operation 420, it may be determined whether the sensor or the application associated with the sensor is a specified sensor or is associated with the specified sensor. Here, the specified sensor may be a biometric sensor or a user-authentication-related sensor set in the electronic device.

In operation 430, if the sensor or the application associated with the sensor is the specified sensor, the process may proceed to operation A, or, if the sensor or the application associated with the sensor is not the specified sensor, the process may proceed to operation B. For example, if the process proceeds to operation A, the electronic device may perform operations 310 to 360 (or 370) of FIG. 3. That is, if a certain sensor (e.g., an iris sensor) is driven, the transmitter may be allowed to transmit a signal in the case where the target memory is the secure memory. As another example, if a certain sensor (e.g., an illumination sensor or a proximity sensor irrelevant to security) or a certain application (e.g., in the case where an HRM sensor is used by an application irrelevant to security) is performed, the process may proceed to operation B so that the transmitter may be allowed to transmit a signal. In the case of proceeding to operation B, the target memory may be set up with the normal memory by default.

A method for obtaining data using a sensor module in an electronic device according to various embodiments of the present disclosure may include setting up, with a secure memory, a target memory of data obtained by a receiver of the sensor module, checking a setting for the target memory before a signal is transmitted from a transmitter of the sensor module, and controlling transmission of the signal based on a result of the checking.

The controlling the transmission of the signal may include allowing the transmitter to transmit the signal if the target memory is the secure memory.

The controlling the transmission of the signal may include restricting transmission of the signal if the target memory is not the secure memory.

The method may include receiving, by the receiver, a response signal for the transmitted signal, and storing the data obtained from the response signal in the target memory.

The setting up the target memory with the secure memory may include driving the sensor module or executing an application associated with the sensor module, determining whether the sensor module is a specified sensor module, and setting up the target memory with the secure memory if the sensor module is the specified sensor module, or setting up the target memory with a normal memory if the sensor module is not the specified sensor module.

The method may further include discarding the data obtained by the receiver of the sensor module if the target memory is not the secure memory.

The method may further include outputting a security warning message if the target memory is not the secure memory.

Figure 5:
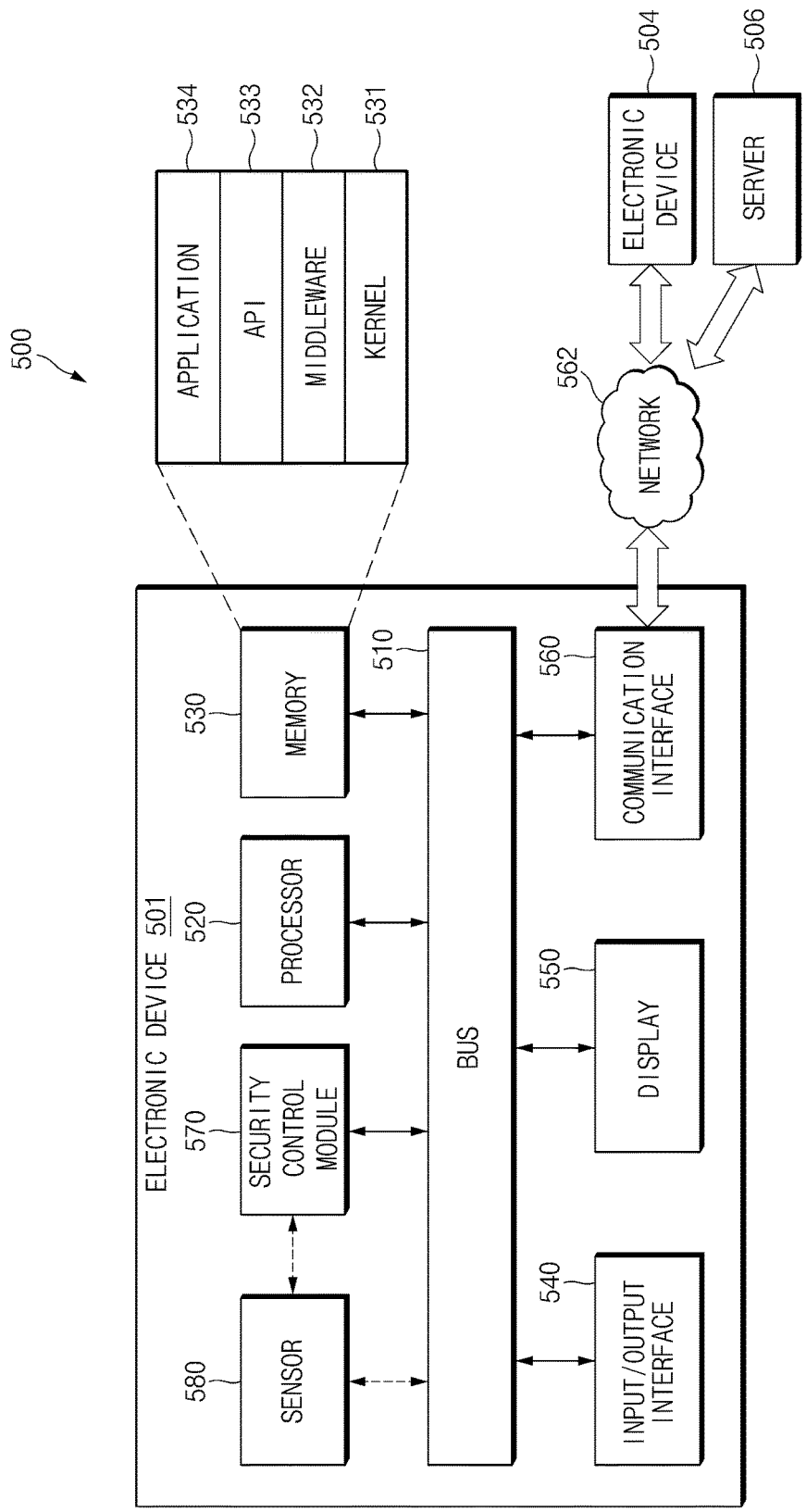
FIG. 5 illustrates a network environment including an electronic device according to various embodiments of the present disclosure.

FIG. 5 illustrates a network environment 500 including an electronic device 501 according to various embodiments of the present disclosure. Electronic device 501 may include a bus 510, a processor 520, a memory 530, an input/output interface 540, a display 550, a communication interface 560, a security control module 570, and at least one sensor 580.

The bus 510 may be a circuit for connecting the above-mentioned elements to each other and transferring communications (e.g., control messages) between the above-mentioned elements.

The processor 520 may receive a command from another element (e.g., the memory 530, the input/output interface 540, the display 550, the communication interface 560, the security control module 570, or the sensor 580) through the bus 510, may interpret the received command, and may perform an operation or data processing according to the interpreted command. For example, the processor 520 may correspond to the normal control module 130 or the processor 220.

The memory 530 may store a command or data received from or generated by the processor 520 or another element (e.g., the input/output interface 540, the display 550, the communication interface 560, the security control module 570, or the sensor 580). For example, the memory 530 may correspond to the normal memory 135 or the memory 230. The memory 530 may include programming modules such as a kernel 531, a middleware 532, an application programming interface (API) 533, or an application 534. Each programming module may include software, firmware, hardware, or a combination of at least two thereof.

The kernel 531 may control or manage system resources (e.g., the bus 510, the processor 520, or the memory 530) used to perform an operation or function of another programming module, for example, the middleware 532, the API 533, or the application 534. Furthermore, the kernel 531 may provide an interface for the middleware 532, the API 533, or the application 534 to access individual elements of the electronic device 501 in order to control or manage the elements.

The middleware 532 may serve as an intermediary between the API 533 or the application 534 and the kernel 531 so that the API 533 or the application 534 communicates and exchanges data with the kernel 531. Furthermore, the middleware 532 may perform a control operation (e.g., scheduling or load balancing) with respect to operation requests received from the application 534 by using, e.g., a method of assigning a priority for using system resources (e.g., the bus 510, the processor 520, or the memory 530) of the electronic device 501 to at least one application 534.

The API 533, which is an interface for allowing the application 534 to control a function provided by the kernel 531 or the middleware 532, may include at least one interface or function (e.g., a command) for, for example, file control, window control, image processing, or character control.

According to various embodiments of the present disclosure, the application 534 may include an SMS/MMS application, an electronic mail application, a calendar application, an alarm application, a health care application (e.g., an application for measuring an amount of exercise or blood sugar), or an environment information application (e.g., an application for providing barometric pressure, humidity or temperature information). Additionally or alternatively, the application 534 may be an application related to information exchange between the electronic device 501 and an external electronic device (e.g., an electronic device 504). The application related to information exchange may include, for example, a notification relay application for transferring specific information to the external electronic device or a device management application for managing the external electronic device.

For example, the notification relay application may include a function of transferring notification information generated by another application (e.g., an SMS/MMS application, an electronic mail application, a health care application, or an environment information application) of the electronic device 501 to the external electronic device. Additionally or alternatively, the notification relay application may receive notification information from the external electronic device and may provide the notification information to a user. The device management application may manage (e.g., install, uninstall or update) a function (e.g., turning on/off an external electronic device (or a component thereof) or adjusting brightness (or resolution) of a display) of at least a part of the external electronic device communicating with the electronic device 501, an application operated in the external electronic device, or a service (e.g., a call service or a messaging service) provided from the external electronic device.

The application 534 may include a specified application according to an attribute (e.g., the type of an electronic device) of the external electronic device. For example, if the external electronic device is an MP3 player, the application 534 may include an application related to playback of music. For another example, if the external electronic device is a mobile medical device, the application 534 may include an application related to health care. The application 534 may be included at least one of a specified application for the electronic device 501 or an application received from the external electronic device (e.g., a server 506 or the electronic device 504).

The input/output interface 540 may transfer a command or data input by a user through an input/output device (e.g., a sensor, a keyboard or a touch screen) to the processor 520, the memory 530, the communication interface 560, or the security control module 570 through, for example, the bus 510. For example, the input/output interface 540 may provide, to the processor 520, data about a touch of the user on a touch screen. Furthermore, the input/output interface 540 may output, through the input/output device (e.g., a speaker or a display), for example, the command or data received from the processor 520, the memory 530, the communication interface 560, or the security control module 570 through the bus 510. For example, the input/output interface 540 may output voice data processed by the processor 520 to the user through a speaker.

The display 550 may show various information (e.g., multimedia data or text data) to the user. For example, the display 550 may correspond to the above-mentioned display unit.

The communication interface 560 may establish a communication connection between the electronic device 501 and an external electronic device (e.g., the electronic device 504 or the server 506). For example, the communication interface 560 may be connected to a network 562 based on a wireless or wired communication technology so as to communicate with the external device. The wireless communication technology may include at least one of wireless fidelity (Wi-Fi), Bluetooth (BT), near field communication (NFC), global positioning system (GPS), or cellular communication (e.g., LTE, LTE-A, CDMA, WCDMA, UMTS, WiBro, or GSM). The wired communication technology may include at least one of universal serial bus (USB), high definition multimedia interface (HDMI), recommended standard 232 (RS-232), or plain old telephone service (POTS).

According to an embodiment of the present disclosure, the network 562 may be a telecommunications network. The telecommunications network may include at least one of a computer network, the Internet, the Internet of things, or a telephone network. According to an embodiment of the present disclosure, a protocol (e.g., a transport layer protocol, a data link layer protocol, or a physical layer protocol) for communication between the electronic device 501 and an external device may be supported by at least one of the application 534, the application programming interface 533, the middleware 532, the kernel 531, or the communication interface 560.

The server 506 may support operation of the electronic device 501 by performing at least one of operations (or functions) implemented in the electronic device 501.

The security control module 570 may process at least a part of information obtained from another element (e.g., the processor 520, the memory 530, the input/output interface 540, the communication interface 560, or the sensor 580), and may provide the processed information to a user in various ways. For example, the security control module 570 may control at least a part of functions of the electronic device 501 independently or using the processor 520 so that the electronic device 501 interworks with another electronic device (e.g., the electronic device 504 or the server 506).

The security control module 570 may include a module for controlling the sensor 580. Furthermore, the security control module 570 may include a secure memory for storing security information such as biometric information or user authentication information. The secure memory may exist as independent hardware separated from the security control module 570. The secure memory may be assigned to a partial area of the memory 530. Furthermore, in various embodiments, the security control module 570 and the processor 520 may be implemented so as to be logically separated from each other in one physical processor.

The security control module 570 may set up, with the secure memory, a memory for storing data obtained by the at least one sensor 580.

The at least one sensor 580 may include not only a typical active sensor for transmitting a signal and receiving a response thereto but also any type of a sensor that transmits an arbitrary signal during a data acquisition process.

Figure 6:
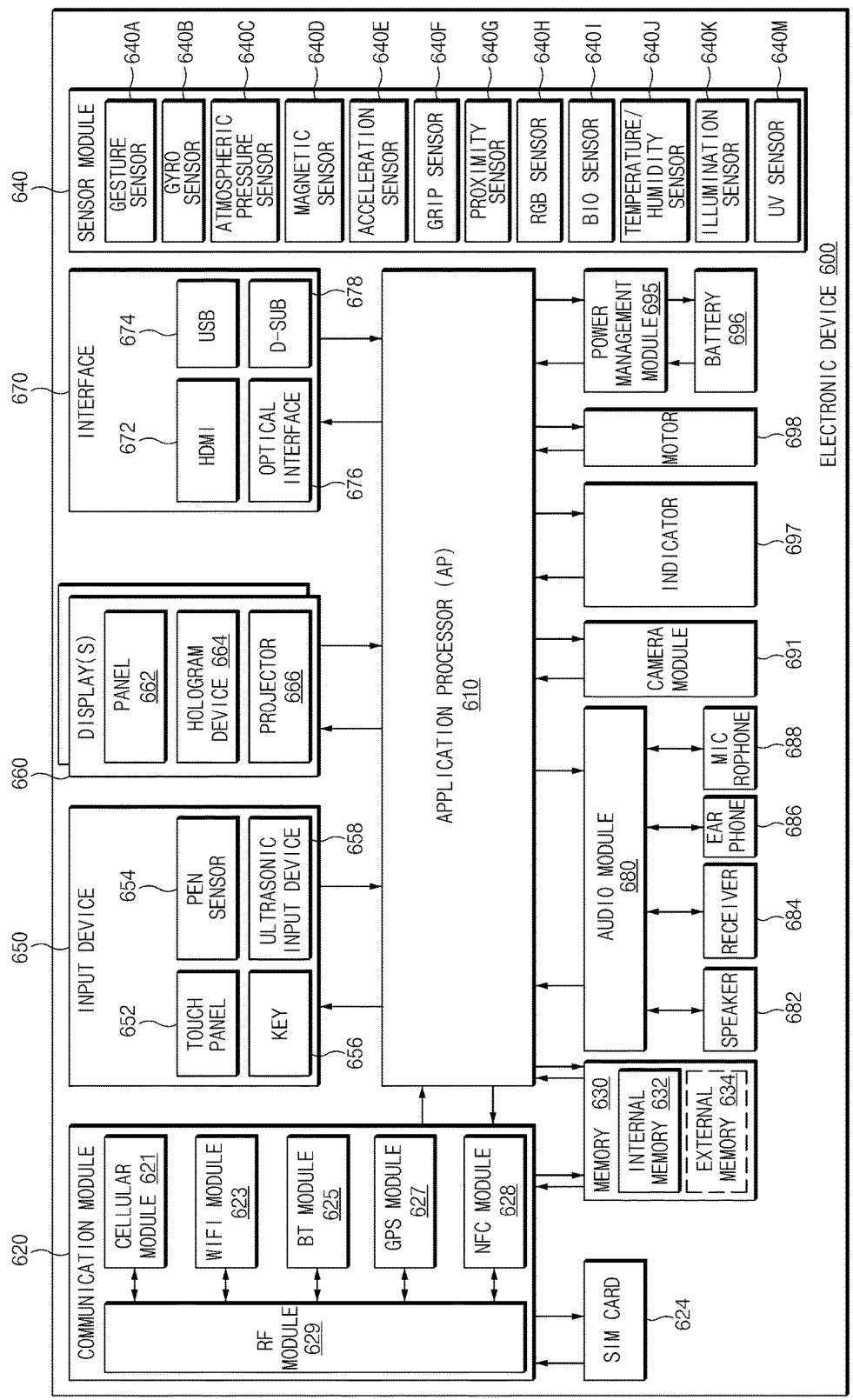
FIG. 6 is a block diagram illustrating an electronic device according to various embodiments of the present disclosure.

FIG. 6 is a block diagram 600 illustrating an electronic device 601 according to various embodiments of the present disclosure. The electronic device 601 may constitute, for example, a part or the entirety of the electronic device 501 illustrated in FIG. 5. Electronic device 601 may include at least one application processor (AP) 610, a communication module 620, a subscriber identification module (SIM) card 624, a memory 630, a sensor module 640, an input device 650, a display 660, an interface 670, an audio module 680, a camera module 691, a power management module 695, a battery 696, an indicator 697, and a motor 698.

The AP 610 may run an operating system or an application program so as to control a plurality of hardware or software elements connected to the AP 610, and may process various data including multimedia data and may perform an operation thereon. The AP 610 may be implemented with, for example, a system on chip (SoC). AP 610 may further include a graphic processing unit (GPU) (not shown).

The communication module 620 (e.g., the communication interface 560) may perform data transmission/reception for communication between the electronic device 601 and another electronic device (e.g., the electronic device 504 or the server 506) connected thereto through a network. According to an embodiment of the present disclosure, the communication module 620 may include a cellular module 621, a Wi-Fi module 623, a BT module 625, a GPS module 627, an NFC module 628, and a radio frequency (RF) module 629.

The cellular module 621 may provide a voice call service, a video call service, a text message service, or an Internet service through a telecommunications network (e.g., an LTE, LTE-A, CDMA, WCDMA, UMTS, WiBro or GSM network). Furthermore, the cellular module 621 may identify and authenticate electronic devices in the telecommunications network using, for example, a subscriber identification module (e.g., the SIM card 624). According to an embodiment of the present disclosure, the cellular module 621 may perform at least a part of functions provided by the AP 610. For example, the cellular module 621 may perform at least a part of a multimedia control function.

According to an embodiment of the present disclosure, the cellular module 621 may include a communication processor (CP). The cellular module 621 may be implemented with, for example, an SoC. Although FIG. 6 illustrates that the cellular module 621 (e.g., a communication processor), the memory 630 and the power management module 695 are separated from the AP 610, the AP 610 may include at least a part of the foregoing elements (e.g., the cellular module 621), according to an embodiment of the present disclosure.

According to an embodiment of the present disclosure, the AP 610 or the cellular module 621 (e.g., a communication processor) may load, on a volatile memory, a command or data received from nonvolatile memories connected to the AP 610 and the cellular module 621 respectively or at least one of other elements, so as to process the command or data. Furthermore, the AP 610 or the cellular module 621 may store, in the nonvolatile memory, data received from or generated by at least one of the other elements.

Each of the Wi-Fi module 623, the BT module 625, the GPS module 627, and the NFC module 628 may include, for example, a processor for processing data transmitted/received through the modules. FIG. 6 illustrates that the cellular module 621, the Wi-Fi module 623, the BT module 625, the GPS module 627, and the NFC module 628 are separate blocks. However, according to an embodiment of the present disclosure, at least a part (e.g., two or more) of the cellular module 621, the Wi-Fi module 623, the BT module 625, the GPS module 627, and the NFC module 628 may be included in a single integrated ch ip (IC) or IC package. For example, at least a part of processors corresponding to the cellular module 621, the Wi-Fi module 623, the BT module 625, the GPS module 627, and the NFC module 628 respectively (e.g., a communication processor corresponding to the cellular module 621 and a Wi-Fi processor corresponding to the Wi-Fi module 623) may be implemented with a single SoC.

The RF module 629 may transmit/receive data, for example, may transmit/receive RF signals. Although not illustrated, for example, a transceiver, a power amp module (PAM), a frequency filter or a low noise amplifier (LNA) may be included in the RF module 629. Furthermore, the RF module 629 may further include a component such as a conductor or a wire for transmitting/receiving free-space electromagnetic waves in a wireless communication system. FIG. 6 illustrates that the cellular module 621, the Wi-Fi module 623, the BT module 625, the GPS module 627, and the NFC module 628 share the single RF module 629. However, according to an embodiment of the present disclosure, at least one of the cellular module 621, the Wi-Fi module 623, the BT module 625, the GPS module 627, or the NFC module 628 may transmit/receive RF signals through an additional RF module.

The SIM card 624 may include a subscriber identification module, and may be inserted into a slot formed at a specific location of the electronic device. The SIM card 624 may include unique identification information (e.g., an integrated circuit card identifier (ICCID)) or subscriber information (e.g., international mobile subscriber identity (IMSI)).

The memory 630 (e.g., the memory 530) may include an internal memory 632 or an external memory 634. The internal memory 632 may include at least one of a volatile memory (e.g., a dynamic RAM (DRAM), a static RAM (SRAM), a synchronous dynamic RAM (SDRAM), or the like) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

The internal memory 632 may be a solid state drive (SSD). The external memory 634 may include a flash drive, for example, compact flash (CF), secure digital (SD), micro secure digital (Micro-SD), mini secure digital (Mini-SD), extreme digital (xD), a memory stick, or the like. The external memory 634 may be functionally connected to the electronic device 601 through various interfaces. The electronic device 601 may further include a storage device (or a storage medium) such as a hard drive.

The sensor module 640 (e.g., the sensor 580) may measure physical quantity or detect an operation state of the electronic device 601 so as to convert measured or detected information into an electrical signal. The sensor module 640 may include, for example, at least one of a gesture sensor 640A, a gyro sensor 640B, a barometric pressure sensor 640C, a magnetic sensor 640D, an accelerometer sensor 640E, a grip sensor 640F, a proximity sensor 640G, a color sensor 640H (e.g., a red/green/blue (RGB) sensor), a biometric sensor 640I, a temperature/humidity sensor 640J, an illumination sensor 640K, or an ultraviolet (UV) sensor 640M. Additionally or alternatively, the sensor module 640 may include, for example, (not shown) an olfactory sensor (E-nose sensor), an electromyography (EMG) sensor, an electroencephalogram (EEG) sensor, an electrocardiogram (ECG) sensor, an infrared (IR) sensor, an iris recognition sensor, or a fingerprint sensor. The sensor module 640 may further include a control circuit for controlling at least one sensor included therein.

The input device 650 may include a touch panel 652, a (digital) pen sensor 654, a key 656, or an ultrasonic input device 658. The touch panel 652 may recognize a touch input using at least one of capacitive, resistive, infrared, and ultraviolet sensing methods. The touch panel 652 may further include a control circuit. In the case of using the capacitive sensing method, a physical contact recognition or proximity recognition is allowed. The touch panel 652 may further include a tactile layer. In this case, the touch panel 652 may provide tactile reaction to a user.

The (digital) pen sensor 654 may be implemented in a similar or same manner as the method of receiving a touch input of a user or may be implemented using an additional sheet for recognition. The key 656 may include, for example, a physical button, an optical button, or a keypad. The ultrasonic input device 658, which is an input device for generating an ultrasonic signal, may enable the electronic device 601 to sense a sound wave through a microphone (e.g., a microphone 688) so as to identify data, wherein the ultrasonic input device 658 is capable of wireless recognition. According to an embodiment of the present disclosure, the electronic device 601 may use the communication module 620 so as to receive a user input from an external device (e.g., a computer or a server) connected to the communication module 620.

The display 660 (e.g., the display 550) may include a panel 662, a hologram device 664, or a projector 666. The panel 662 may be, for example, a liquid crystal display (LCD), an active-matrix organic light-emitting diode (AM-OLED) display, or the like The panel 662 may be, for example, flexible, transparent or wearable. The panel 662 and the touch panel 652 may be integrated into a single module. The hologram device 664 may display a stereoscopic image in a space using a light interference phenomenon. The projector 666 may project light onto a screen so as to display an image. The screen may be disposed in the inside or the outside of the electronic device 601. According to an embodiment of the present disclosure, the display 660 may further include a control circuit for controlling the panel 662, the hologram device 664, or the projector 666.

The interface 670 may include, for example, a high definition multimedia interface (HDMI) 672, a universal serial bus (USB) 674, an optical interface 676, or a D-sub miniature (D-sub) 678. The interface 670 may be included in the communication interface 560 illustrated in FIG. 5. Additionally or alternatively, the interface 670 may include, for example, a mobile high-definition link (MHL) interface, a secure digital (SD) card/multi-media card (MMC) interface, or an infrared data association (IrDA) interface.

The audio module 680 may convert a sound into an electrical signal or vice versa. At least a part of elements of the audio module 680 may be included in the input/output interface 540 illustrated in FIG. 5. The audio module 680 may process sound information input or output through a speaker 682, a receiver 684, an earphone 686, or the microphone 688.

The camera module 691 for shooting a still image or a video may include at least one image sensor (e.g., a front sensor or a rear sensor), a lens (not shown), an image signal processor (ISP) (not shown), or a flash (e.g., an LED or a xenon lamp) (not shown).

The power management module 695 may manage power of the electronic device 601. Although not illustrated, a power management integrated circuit (PMIC), a charger integrated circuit (IC), or a battery or fuel gauge may be included in the power management module 695.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. The charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, a rectifier, or the like.

The battery gauge may measure, for example, a remaining capacity of the battery 696 and a voltage, current or temperature thereof while the battery is charged. The battery 696 may store or generate electricity, and may supply power to the electronic device 601 using the stored or generated electricity. The battery 696 may include, for example, a rechargeable battery or a solar battery.

The indicator 697 may display a specific state of the electronic device 601 or a part thereof (e.g., the AP 610), such as a booting state, a message state, a charging state, or the like. The motor 698 may convert an electrical signal into a mechanical vibration. Although not illustrated, a processing device (e.g., a GPU) for supporting a mobile TV may be included in the electronic device 601. The processing device for supporting a mobile TV may process media data according to the standards of digital multimedia broadcasting (DMB), digital video broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-program mable gate array (FPGA), or a programmable-logic device for performing some operations, which are known or will be developed.

According to various embodiments of the present disclosure, at least a part of devices (e.g., modules or functions thereof) or methods (e.g., operations) according to various embodiments of the present disclosure may be implemented as instructions stored in a computer-readable storage medium in the form of a programming module. In the case where the instructions are performed by at least one processor (e.g., the processor 522), the at least one processor may perform functions corresponding to the instructions. The computer-readable storage medium may be, for example, the memory 530. At least a part of the programming module may be implemented (e.g., executed) by the processor 510. At least a part of the programming module may include, for example, a module, a program, a routine, sets of instructions, or a process for performing at least one function.

The computer-readable storage medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and a hardware device configured to store and execute program instructions (e.g., a programming module), such as a read only memory (ROM), a random access memory (RAM), a flash memory, or the like. The program instructions may include machine language codes generated by compilers and high-level language codes that can be executed by computers using interpreters. The above-mentioned hardware may be configured to be operated as one or more software modules for performing operations of various embodiments of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

According to various embodiments of the present disclosure, a storage medium stores instructions configured to instruct at least one processor to perform at least one operation when being executed by the at least one processor, the at least one operation including setting up, with a secure memory, a target memory of data obtained by a receiver of the sensor module, checking a setting for the target memory before a signal is transmitted from a transmitter of the sensor module, and controlling transmission of the signal based on a result of the checking.

The storage medium may additionally store an instruction for allowing the transmitter to transmit the signal if the target memory is the secure memory or for restricting transmission of the signal if the target memory is not the secure memory.

The storage medium may additionally store an instruction for performing receiving, by the receiver, a response signal for the transmitted signal and storing the data obtained from the response signal in the target memory.

The storage medium may additionally store an instruction for performing driving the sensor module or executing an application associated with the sensor module, determining whether the sensor module is a specified sensor module, and setting up the target memory with the secure memory if the sensor module is the specified sensor module, or setting up the target memory with the secure memory by setting up the target memory with a normal memory if the sensor module is not the specified sensor module.

The storage medium may additionally store an instruction for discarding the data obtained by the receiver of the sensor module or outputting a security warning message if the target memory is not the secure memory.

According to various embodiments of the present disclosure, a memory in which data obtained by a sensor is to be stored is checked before the data is obtained using the sensor, so that the security may be improved with respect to acquisition of data that requires a high level of security such as biometric information.

The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. An electronic device comprising:
a display;
at least one sensor comprising a transmitter for transmitting a signal and a receiver for receiving a response signal to the transmitted signal, wherein the at least one sensor is configured to obtain biometric data based on the response signal, wherein the obtained biometric data is compared with a pre-stored biometric data for user authentication;
a normal memory;
a secure memory for storing the obtained biometric data; and
a security controller, connected with the at least one sensor and the secure memory, configured to:
determine if the obtained biometric data is designated to be stored in the secure memory,
allow the transmitter to transmit the signal the obtained biometric data is designated to be stored in the secure memory,
prevent the transmitter from transmitting the signal if the obtained biometric data is not designated to be stored in the secure normal memory; and
a controller configured to control the display to display content related to a security risk based on the determination.

2. The electronic device of claim 1, wherein the security controller allows the receiver to receive the response signal if the data corresponding to the obtained biometric data is designated to be stored in the secure memory.

3. The electronic device of claim 1, further comprising a display unit configured to output content related to a security risk.

4. The electronic device of claim 1, wherein the security controller is configured to store, in a target memory, the biometric data received by the receiver.

5. The electronic device of claim 1, wherein the sensor is a biometric information recognizing sensor.

6. The electronic device of claim 1, wherein the transmitter is directly connected to the security controller.

7. The electronic device of claim 1,
wherein the controller physically separated from the security controller; and
wherein the memory physically separated from the secure memory,
wherein the controller sets one of the secure memory and the normal memory as a target memory.

8. The electronic device of claim 1, wherein the biometric data is at least one of fingerprint data and iris pattern data.

9. A method for obtaining data using a sensor module in an electronic device, the method comprising:
determining if an obtained biometric data from a receiver is designated to be stored in a secure memory before a transmitter transmits a signal, wherein receiver receives a response signal to a signal transmitted from a transmitter, wherein the sensor is configured to obtain the biometric data, wherein the obtained biometric data is compared with a pre-stored biometric data for user authentication;
transmitting the signal associated with the biometric data, if the obtained biometric data is designated to be stored in the secure memory;
preventing transmission of the signal associated with the biometric data, if the obtained biometric data is designated to be stored in a normal memory separate from the secure memory; and
displaying content related to a security risk based on the determination.

10. The method of claim 9, comprising:
receiving, by the receiver, the response signal to obtain the biometric data; and
storing the obtained biometric data in a target memory.

11. The method of claim 9, further comprising:
driving the sensor or an application associated with the sensor module;
determining whether the sensor is a specified sensor; and
setting up, as the secure memory, a target memory if the sensor is the specified sensor, or setting up the target memory with the normal memory if the sensor is not the specified sensor.

12. The method of claim 9, further comprising discarding the biometric data received from the receiver of the sensor if the biometric data received from the receiver is not designated to be stored in the secure memory.

13. The method of claim 9, further comprising outputting a security warning message if the data corresponding to the biometric data received from the receiver is not designated to be stored in the secure memory.

14. A non-transitory recording medium for storing computer-readable instructions for instructing an electronic device for obtaining data using a sensor comprising a transmitter and a receiver to perform:
determining if obtained biometric data from the receiver is designated to be stored in a secure memory before the transmitter transmits a signal, wherein receiver receives a response signal to a signal transmitted from a transmitter, wherein the sensor is configured to obtain the biometric data, wherein the obtained biometric data is compared with a pre-stored biometric data for user authentication;
transmitting the signal associated with biometric data if the obtained biometric data received is designated to be stored in the secure memory;
preventing transmission of the signal associated with the biometric data, if the obtained biometric data is designated to be stored in a normal memory separate from the secure memory; and
displaying content related to a security risk based on the determination.

15. The recording medium of claim 14, wherein the recording medium additionally stores an instruction for performing:
receiving, by the receiver, the response signal to obtain the biometric data; and
storing the obtained the biometric data in a target memory.

* * * * *